(12) United States Patent
Arumugham et al.

(10) Patent No.: US 7,809,025 B2
(45) Date of Patent: Oct. 5, 2010

(54) SYSTEM AND METHOD FOR DISTRIBUTING CLOCK SIGNALS

(75) Inventors: Rangaswamy Arumugham, Richardson, TX (US); Lisa Pallotti, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1041 days.

(21) Appl. No.: 11/540,244

(22) Filed: Sep. 29, 2006

(65) Prior Publication Data

US 2008/0080566 A1    Apr. 3, 2008

(51) Int. Cl.
*H04J 3/06*    (2006.01)
(52) U.S. Cl. .................................. 370/503
(58) Field of Classification Search ............ 370/503, 370/502, 509, 512, 518, 438, 439, 432, 437, 370/252; 375/354, 356; 713/400, 375, 500, 713/503; 361/119
See application file for complete search history.

(56) References Cited

U.S. PATENT DOCUMENTS

| | | | |
|---|---|---|---|
| 4,989,175 A * | 1/1991 | Boris et al. ................. | 713/401 |
| 5,631,931 A * | 5/1997 | Takano et al. ............... | 375/347 |
| 5,870,592 A * | 2/1999 | Dreps et al. ................. | 713/500 |
| 6,041,066 A * | 3/2000 | Meki et al. .................. | 370/512 |
| 6,055,362 A | 4/2000 | Kesner et al. | |
| 6,452,789 B1 | 9/2002 | Pallotti et al. | |
| 6,516,422 B1 * | 2/2003 | Doblar et al. ............... | 713/503 |
| 6,596,948 B1 | 7/2003 | Pallotti et al. | |
| 6,639,779 B2 * | 10/2003 | Knigge et al. ............... | 361/119 |
| 6,818,835 B2 | 11/2004 | Pallotti et al. | |
| 2005/0123085 A1 | 6/2005 | Skog et al. | |
| 2006/0165130 A1 | 7/2006 | Wissell et al. | |

* cited by examiner

*Primary Examiner*—Chi H Pham
*Assistant Examiner*—Alexander Boakye

(57) ABSTRACT

There is provided a method of operating a computer system. The computer system comprises at least two cabinets and the at least two cabinets have at least one clock signal. The method includes selecting one of the at least one clock signal to serve as a master signal, and synchronizing the computer system to operate from the master signal. Additionally, the method includes altering the capacity of the system while the system is operating.

20 Claims, 4 Drawing Sheets

SYSTEM AND METHOD FOR DISTRIBUTING CLOCK SIGNALS

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Generally speaking, servers are computer systems that operate on a network and provide services to clients. The servers typically run specialized operating systems configured to provide resources and applications to clients over the network. The clients, therefore, depend on the availability of the server and precautions are taken to prevent server downtime. Downtime can be especially problematic in mission-critical applications that have a requirement to be up and running 24 hours a day, seven days a week.

Depending on the needs of the network, a server system may include a single cabinet or may span across multiple cabinets. The operating systems of servers, as well as some hardware, including memory, require clock signals from a common oscillator to be available everywhere and the clock signals are used in synchronizing the activities of the server. Regardless of a server's size, additional server capacity may be required to meet increased demand for a server's applications or resources. Capacity can be increased through the addition of midplanes to an existing cabinet and/or new cabinets. However, in order to add capacity, scheduled down times have conventionally been necessary in order to synchronize the operations of the server.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A system and method for distributing clock signals across cabinets in a server system is provided. The system and method allow for on-line addition of cabinets and allows a single instantiation of an operating system to span processors in multiple cabinets. Additionally, the system and method provide the capability of continuous operation of a server system and all cabinets in the system in the event that an oscillator or cabinet is unavailable. Furthermore, the system and method allow for on-line deletion or removal of cabinets from the system.

Figure 1:
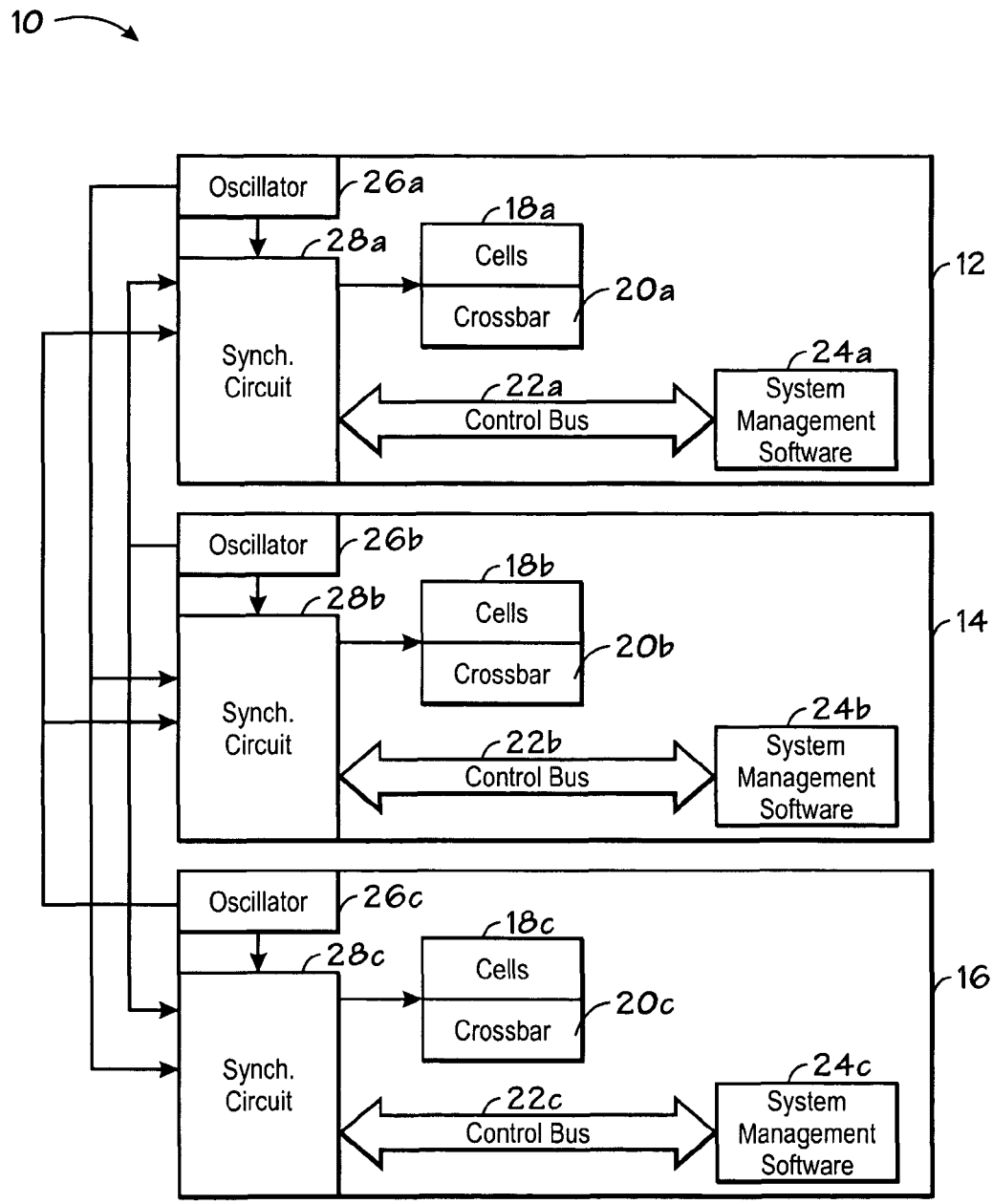
FIG. 1 illustrates a block diagram of a server system having multiple server cabinets according to an exemplary embodiment of the present invention.

Turning initially to FIG. 1, a block diagram of a multi-cabinet server system is illustrated according to an exemplary embodiment of the present invention and is generally designated by the reference numeral 10. The system 10 includes a first cabinet 12, a second cabinet 14, and a third cabinet 16. The server system 10 is capable of expansion to include additional cabinets as desired to increase capacity.

The server system 10 may be configured to operate in a variety of configurations and capacities. For example, in one embodiment, the system 10 may operate as a single unit as a web server. In an alternate embodiment, the first and second cabinets 12 and 14 may operate together as a web server, while the third cabinet 16 operates as an email server.

A cell architecture may be implemented within each cabinet to provide processing and memory resources for the system 10. As such, each of the cabinets 12-16 is shown with a cell block 18a-c. Each cell block 18a-c may have multiple cells each with multiple processors and its own memory hardware. Crossbar devices 20a-c, such as a crossbar backplanes, for example, may be provided for communication between the cells 18a-c of the cabinets. The crossbar devices 20a-c allow for high speed data communication between the cells.

Additionally, the cabinets 12-16 may include a control bus 22a-c, such as a system clock control bus, for example, that connects the various parts of the cabinets 12-16. The control bus 22a-c may be configured to communicate configuration information between the components and system management software 24a-c. The system management software 24a-c may include the BIOS, for example.

Each of the cabinets 12-16 includes an oscillator 26a-c that provides a clock signal output. Each of the oscillators 26a-c operates at about the same frequency, such as 200 MHz, for example. Even though the oscillators 26a-c operate at the same frequency they may, however, operate out of phase of each other. Each oscillator 26a-c provides the clock signal output to each synchronizing circuit 28a-c of each of the cabinets 12-16. In this way, each synchronizing circuit 28a-c receives the same number of clock signals as there are cabinets in the system 10.

The synchronizing circuits 28a-c may be any type of suitable synchronizing device, such as a phase-locked loop (PLL), a surface acoustic wave PLL (SAW PLL), digital delay locked loop (DLL) or other devices such as dielectric resonators, for example. The synchronizing circuits 28a-c may provide multiple outputs of the same clock signal. For example, the synchronizing circuits 28a-c may provide a signal to the cells 18a-c and a clock signal to crossbar devices 20a-c.

Currently, SAW PLLs are commercially available that are capable of synchronizing multiple clock signal sources. The SAW PLLs can be configured to automatically resynchronize with an alternate clock signal in the event the original clock signal on which it is currently operating becomes unavailable or unusable. During a re-synchronizing event, the SAW PLLs continue to provide a continuous clock signal output. This is due to the inherent high Q value of SAW resonators. Thus, in a computer system environment, a re-synchronization event may occur without interrupting the operation of the system.

During an initial set-up of the system 10, the system management software 24a-c determines from which clock signal the cabinets 12-16 will operate. As explained earlier, the cabinets 12-16 may operate as a single unit or as stand alone servers. In the event that the cabinet is to operate as a stand alone server, it may simply use a clock signal that is local to that cabinet. In the event that multiple cabinets are configured together for use by an operating system requiring a common master clock source, the cabinets may synchronize to a clock signal from any one of the cabinets.

Communication between the synchronizing circuits 28a-c and the system management software 24a-c occurs via the control bus 22a-c. Specifically, the control bus 22a-c may provide a control signal, such as a reference select, or REF_SEL signal to the synchronization circuit 28a-c. The control signal indicates which of the clock signals should be used as a master signal. Additionally, the synchronizing circuits 28a-c may indicate to the system management software 24a-c clock signals that are currently available, the addition of new clock signals, as well as the status of the current clock signal being used.

Upon receiving an indication as to which clock signal the cabinet is to use, the synchronizing circuits 28a-c synchronize to the designated signal and output the synchronized clock signals to the cells 18a-c and crossbar devices 20a-c. For example, the synchronizing circuit 28a may receive a control signal indicating that a local clock signal should be used. This may be because the clock signal from oscillator 26a has been selected to operate as a master signal, or the cabinet 12 is operating as a stand alone server. In either event, the synchronizing circuit 28a outputs the clock signal of the oscillator 26a to the cells 18a and the crossbar device 20a.

In the event that the clock signal from the oscillator 26a is to be used as the master signal for the other cabinets 14 and 16, the synchronizing devices 28b and 28c will each receive a control signal indicating that the clock signal from the oscillator 26a is to be used as the master signal and the clock signals from the oscillators 26b and 26c will be placed in a stand-by mode. The synchronizing devices 28b and 28c synchronize their respective output clock signals to have the same frequency as the clock output of oscillator 26a. Thus, clock signals in all cabinets experience the same frequency and phase drift, if any, as the master oscillator which is a requirement for certain operating system types.

The system 10 is capable of adding capacity, in the form of additional cabinets, without shutting down the system or going off-line. Specifically, cabinets can be added to the system 10 while the system 10 is on-line or up and running. The new cabinets (not shown) are simply interconnected with the other cabinets 12-16 of the system 10 via cables that allow for the distribution and receiving of clock signals. As described above, each of the cabinets 12-16 will receive the clock signal from the new cabinet and the new cabinet will receive a clock signal from each of the cabinets 12-16 already in the system.

Once the new cabinet is connected to the other cabinets 12-16 in the system 10, the system management software 24 evaluates the system and assigns a master clock signal for synchronization purposes. Specifically, the synchronization circuits 28 of the system 10 indicate to the system management software 24 that a new clock signal is available and the system management software 24 determines whether to change the assignment of the master signal. If no change is to be made to the assignment of the master signal, the new cabinet will simply synchronize to the current master signal. Alternatively, if a new master clock signal is selected, each of the cabinets of the system 10 will synchronize to the new master clock signal without interrupting operations.

The system 10 also allows for online deletion, or removal of cabinets, as well as automatic switch-over in the event that a clock signal is not available. In the event that the master clock ceases operating properly, the synchronizing circuits 28a-c automatically re-select a new master clock from one of the remaining clock signals. All of the cabinets 12-16 then synchronize with the new master clock, including the cabinet whose clock has ceased proper operation. Thus, there is no downtime when a clock signal becomes unavailable, and no capacity is lost. Additionally, if a cabinet 12-16 needs to be removed for any reason, it may be removed without disrupting the operation of the other cabinets.

Figure 2:
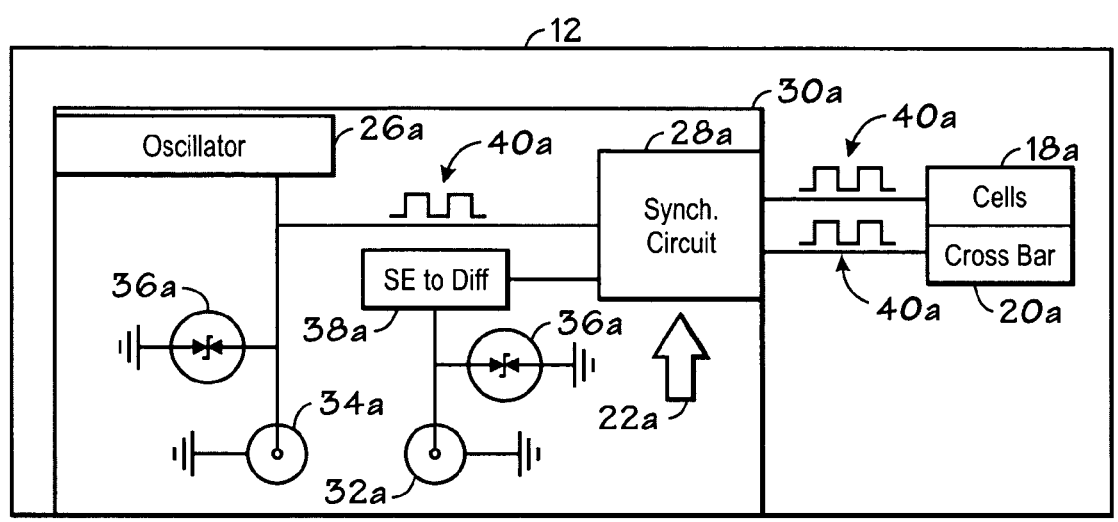
FIG. 2 illustrates a block diagram of a server cabinet of FIG. 1 according to an exemplary embodiment of the present invention.

Turning now to FIG. 2, a block diagram of a single cabinet server system is illustrated according to an exemplary embodiment of the present invention. Specifically, a device 30a, such as a mid-plane, for example, is shown connecting to cells 18a and a crossbar device 20a. The device 30a may represent a portion of the chassis of the cabinet 12 and allows for cables to be attached to the cabinets.

The device 30a may include several of the components and features described earlier. For example, the device 30a may include the oscillator 26a, the synchronizing device 28a, and the control bus 22a. The oscillator 26a serves as a local clock for the device 30a and the cabinet 12. The clock signal 40a of oscillator 26a is provided to the synchronizing circuit 28a and may also be made available for other cabinets or devices, as will be described in greater detail below. The control bus 22a is used for communicating configurations between the synchronization circuit 28a and system management software (not shown).

The device 30a also includes means for sharing and receiving clock signals with other cabinets. Specifically, input connector 32a and output connector 34a are provided. The input connector 32a is configured to receive an external clock signal, such as a clock signal from another cabinet, for example. While only a single input connector is shown, multiple input connectors may be provided. The output connector 34a is provided to allow the clock signal 40a from oscillator 26a to be distributed to other cabinets.

To protect against over voltages that may occur due to electrostatic discharge when connecting multiple cabinets together, transient voltage suppressor (TVS) diodes 36a may be coupled to both the input connector 32a and the output connector 34a. The TVS diodes 36a may be bidirectional TVS zener diodes, for example, as shown in FIG. 2.

The input connector 32a is coupled to a single-ended-to-differential (SE-to-diff) converter 38a which is coupled to the synchronization circuit 28a. The SE-to-diff converter 38a conditions an incoming clock signal before passing the clock signal to the synchronization circuit 28a.

The synchronizing circuit 28a is configured to provide a clock signal for use by the cabinet 12. Specifically, the synchronizing circuit 28a may be configured to provide the clock signal 40a to cells 18a. The number of cells implemented in an actual embodiment may vary. For example, in one embodiment, four cells may be provided, while in another embodiment, eight cells may be provided. Each cell may have multiple processors according to need and design. For example, some cells may be configured with four processors or more. Additionally, each cell may include random access memory (RAM) and a cell controller.

The clock signal 40a from the synchronizing circuit 28a may also be provided to the crossbar device 20a. The crossbar device 20a allows for communication and data transfer between cells 18a and from one cabinet to all other cabinets. The clock signal 40a from the synchronizing circuit 20a synchronizes the crossbar device 20a with the cells 18a.

Figure 3:
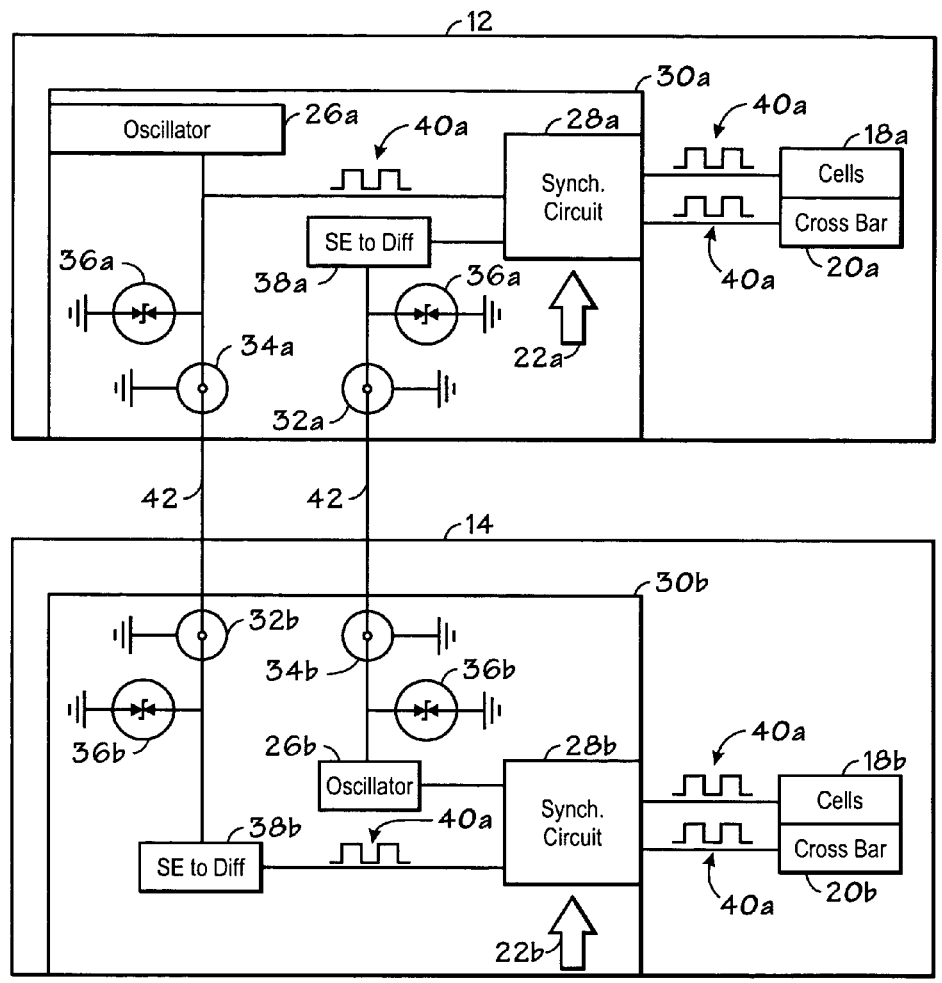
FIG. 3 illustrates the addition of a server cabinet to the server system of FIG. 2 according to an exemplary embodiment of the present invention.

Looking at FIG. 3, the altering of the capacity of the server system of FIG. 2 by the addition of a server cabinet is illustrated according to an exemplary embodiment of the present invention. Specifically, the cabinet 14 is connected to the cabinet 12 via cables 42 while the first cabinet 12 is on-line or up and running. The cables 42 run between the input and output connectors 32a and 34a of the first cabinet 12 and input and output connectors 32b and 34b of the second cabinet 14. As mentioned earlier, the TVS diodes 36a and 36b protect the mid-planes 30a and 30b while the cabinets 12 and 14 are being connected.

Once the cabinets 12 and 14 have been connected, the synchronizing circuits 28a-b indicate available clocks and receive an indication via a control signal on the control bus 22a-b as to which clock signal will serve as a master signal. As can be seen in FIG. 3, the clock signal 40a from the oscillator 26a is serving as the master signal and the synchronizing device 28b has synchronized with the master signal. The synchronizing circuit 28b synchronizes its output to have the same frequency as the master signal without needing to shut-down and restart the cabinets. Thus, the two cabinets 12 and 14 can operate together as a server system and the cells 18a-b (processors and memory) and the crossbar devices 20a-b are all synchronized.

Though identical hardware is shown for the cabinets 12 and 14 of FIG. 3, an actual implementation may vary, with only the operating frequency of the oscillators 26a-b being the same. For example, the synchronizing device 28a may be a digital signal processing based delay locked loop (DLL), while the synchronizing device 28b may be an analog technology based SAW PLL. Additionally, each cabinet 12 and 14 may have a different number of cells. Such variations, however, would still beneficially allow for the on-line addition and deletion of cabinets, as well as the capability to switch over to a new master clock signal in the event that a particular signal becomes unavailable.

Figure 4:
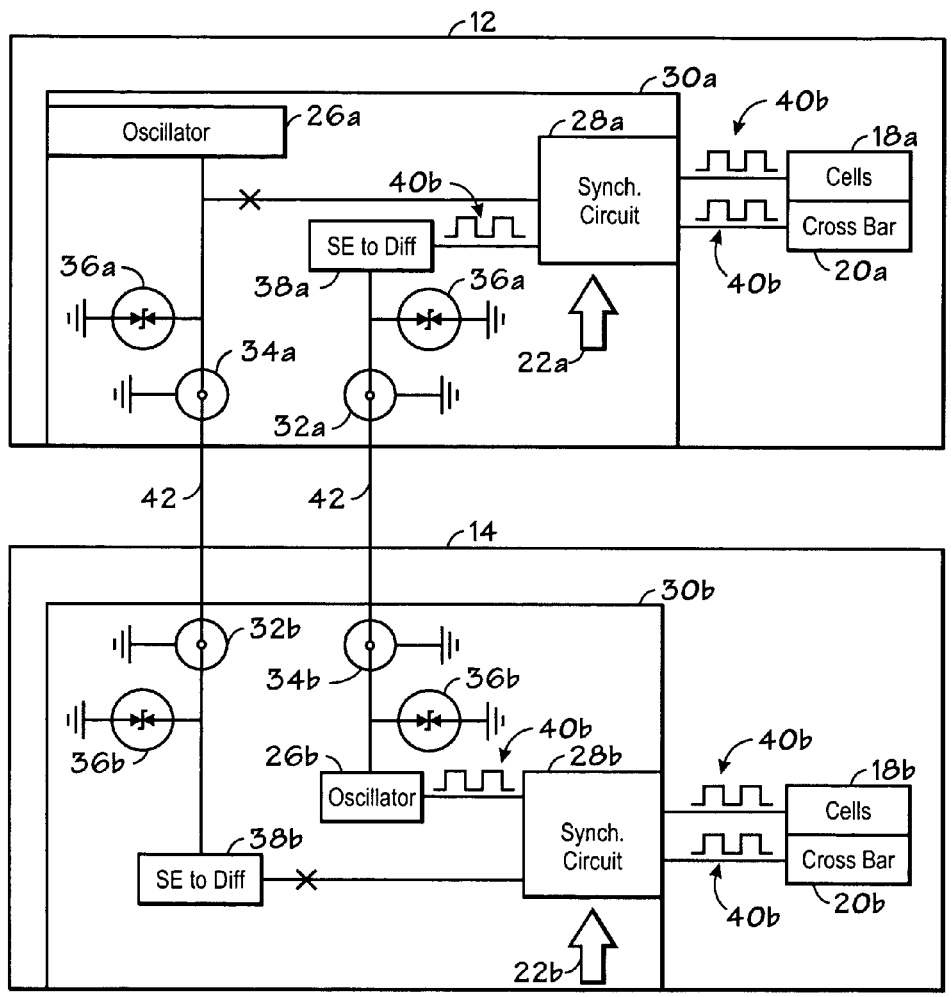
FIG. 4 illustrates operation of the server system FIG. 3 synchronizing to a new clock signal according to an exemplary embodiment of the present invention.

To illustrate the operation of a two cabinet computer system in the event that a clock signal should become unavailable, FIG. 4 shows the two cabinet system of FIG. 3 being synchronized to the clock signal 40b from oscillator 26b instead of the clock signal 40a from oscillator 26a. As can be seen, in FIG. 4, the clock signal 40a from oscillator 26a is unavailable. The synchronizing circuits 28a-b automatically switch over to another available clock signal, such as the clock signal 40b from oscillator 26b. The frequency of the output of the synchronizing circuits 28a-b slew to synchronize with the clock signal 40b from oscillator 26b. Eventually, the synchronizing circuits 28a-b synchronize with the new clock signal 40b with minimal disturbance on the output signal of the synchronizing circuits 28a-b. Because the phase change is gradual, there is no interruption to the operation the cabinets 12 and 14. As such, there is no downtime that occurs and no reduction in capacity for the server system.

Table A illustrates the operation of the synchronizing circuits 28a-b in a two cabinet system according to a control signal, such as a reference select (REF_SEL) signal, for example. REF_SEL signals are part of the bi-directional control bus 22a-c and are controlled by system management software. Two possible environments are provided: stand alone and common clock. In the stand alone environment, each cabinet operates as an independent server. In the common clock environment, the cabinets may operate independently, or may operate together.

TABLE A

| ENVIRONMENT | NORMAL OPERATION | | | | A-unavailable | | B-unavailable | |
|---|---|---|---|---|---|---|---|---|
| | REFSEL-1 | REFSEL-2 | OUT-A | OUT-B | OUT-A | OUT-B | OUT-A | OUT-B |
| Standalone Cabinets | 0 | 0 | Clock-A | Clock-B | Clock-B | Clock B | Clock-A | Cock-A |
| Common Clock | 0 | 1 | Clock-A | Clock-A | Clock-B | Clock-B | Clock-A | Clock-A |

REFERENCE SELECT LOGIC:
0 = LOCAL CLOCK SOURCE
1 = REMOTE CLOCK SOURCE

In the stand alone environment, the REF_SEL −1 and REF_SEL −2 signal indicate that the cabinets should use a local clock signal, one that is internal to the cabinet, by providing a "0" signal on the control bus 22a-c. Looking at FIG. 4, if the first cabinet 12 receives a REF_SEL signal of "0," the synchronizing circuit 28a synchronizes with the clock signal 40a from oscillator 26a. If, however, the local clock were to become unavailable, the system automatically switches over to another clock signal, such as the clock signal 40b from oscillator 26b. For example, in the event that oscillator 26a becomes unavailable, the output of synchronizing device 28a would switch to clock signal 40b from oscillator 26b. Thus, even though they may be operating as stand alone cabinets, in the event one of the clock signals becomes unavailable, both systems can remain in operation by synchronizing to a common clock.

In the event a common clock is desired, such as when a single instance of an operating system is to operate across multiple cabinets, REF_SEL 2 signal may be set to "1," indicating a remote clock source is to be used for cabinet 14. The REF_SEL 1 signal is set to "0" indicating that a local clock source should be used for cabinet 12. Thus, referring again to FIG. 4, under normal operation, both cabinet 12 and cabinet 14 use the clock signal 40a from oscillator 26a. In the event a clock signal becomes unavailable, however, both cabinets switch to use clock signal 40b, as described earlier.

The system and method disclosed herein provide for unrestricted instantiation of operating system across multiple cabinets, automatic sharing of master clocks, and increased resiliency for server systems. The implementation of the systems and methods allows for the alteration of capacity, through addition or deletion of cabinets, without interruption of service.

What is claimed is:

1. A method of operating a computer system, comprising:
   operating a computer system, the computer system comprising at least two cabinets, wherein each of the at least two cabinets comprises an oscillator configured to generate at least one clock signal;
   selecting one of the at least one clock signals to serve as a master signal;
   synchronizing the cabinets of the computer system to operate from the master signal; and
   altering the capacity of the computer system while the computer system is operating.

2. The method of claim 1, wherein altering the capacity of the computer system comprises adding a cabinet.

3. The method of claim 1, wherein altering the capacity of the computer system comprises removing a cabinet.

4. The method of claim 1 further comprising providing a control signal to indicate selection of the master signal.

5. The method of claim 1 further comprising running a single instance of an operating system across multiple cabinets.

6. The method of claim 1 further comprising using a surface acoustic wave phase locked loop to synchronize a cabinet.

7. The method of claim 1 further comprising providing automatic re-selection of a new master clock signal in the event that the master clock signal becomes unavailable.

8. The method of claim 1 further comprising providing transient voltage suppressing diodes, wherein the transient voltage diodes are configured to protect against transient voltages that may occur when altering the capacity of the computer system.

9. A method of operating a computer system, comprising:
   operating a computer system, the computer system comprising at least two cabinets, the at least two cabinets having at least one clock signal each;
   selecting one of the at least one clock signals to serve as a master signal;
   synchronizing the cabinets of the computer system to operate from the master signal;
   altering the capacity of the computer system while the computer system is operating; and
   evaluating the status of the at least one clock signal and re-assigning the master clock signal upon altering the capacity of the computer system and synchronizing the computer system to operate from a new master signal.

10. A method of operating a computer system, comprising:
    operating a computer system, the computer system comprising at least two cabinets, the at least two cabinets having at least one clock signal each;
    selecting one of the at least one clock signals to serve as a master signal;
    synchronizing the cabinets of the computer system to operate from the master signal;
    altering the capacity of the computer system while the computer system is operating; and
    providing a synchronized signal to multiple cells and a crossbar device, wherein the cells include at least one processor and memory hardware.

11. A computer system comprising:
    a first cabinet comprising:
        a first oscillator; and
        a first synchronization circuit coupled to the first oscillator and configured to provide a clock signal to processors of the first cabinet;
    a second cabinet coupled to the first cabinet via cables, wherein the second cabinet comprises:
        a second oscillator; and
        a second synchronization circuit coupled to the second oscillator and configured to provide a clock signal to processors of a second cabinet; and
    a control bus, wherein the control bus provides a control signal to the first and second cabinets indicating which oscillator is to serve as a master clock.

12. The computer system of claim 11, wherein the first and second synchronization circuits are surface acoustic wave phase locked loops.

13. The computer system of claim 11, wherein the first and second synchronization circuits are digital delay locked loops.

14. The computer system of claim 11, wherein the first synchronization circuit is a digital delay locked loop and the second synchronization circuit is a surface acoustic wave phase locked loop.

15. The computer system of claim 11 comprising transient voltage suppressing diodes coupled to the cables.

16. The computer system of claim 11 comprising connectors to allow for increasing the capacity of the system.

17. An apparatus for clock distribution in a server environment comprising:
    a cabinet comprising:
        an oscillator configured to provide a first clock signal;
        a first synchronization circuit coupled to the oscillator, the first synchronization circuit configured to distribute a clock signal to cells;
        a first connector coupled to the oscillator, the first connector configured to receive the first clock signal from the oscillator to a second synchronization circuit;
        a second connector coupled to the first synchronization circuit, the second connector configured to receive a second clock signal from a remote oscillator; and
        a control bus coupled to the cabinet configured to communicate a status of multiple oscillators and to indicate selection of a master clock signal.

18. The apparatus of claim 17 comprising a transient voltage suppressing diode coupled to the first connector and a transient voltage suppressing diode coupled to the second connector.

19. The apparatus of claim 17 comprising a single-ended-to-differential converter coupled between the synchronization circuit and the second connector.

20. The apparatus of claim 17 wherein the processors are configured to operate in a cell architecture.

* * * * *